(12) United States Patent
Meeks et al.

(10) Patent No.: US 7,284,203 B1
(45) Date of Patent: Oct. 16, 2007

(54) METHOD AND APPARATUS FOR APPLICATION SHARING INTERFACE

(75) Inventors: William Scott Meeks, Arlington, MA (US); Jeffrey Lawrence Sokolov, Lexington, MA (US)

(73) Assignee: Verizon Laboratories Inc., Waltham, MA (US)

( * ) Notice: Subject to any disclaimer, the term of this patent is extended or adjusted under 35 U.S.C. 154(b) by 485 days.

(21) Appl. No.: 09/362,014

(22) Filed: Jul. 27, 1999

(51) Int. Cl.
*G06F 3/00* (2006.01)
*G06F 15/16* (2006.01)

(52) U.S. Cl. .................... 715/751; 715/753; 715/759; 709/205; 709/204

(58) Field of Classification Search ............... 345/751, 345/753, 755, 759, 969, 733, 740, 741, 743, 345/748, 783, 738, 739, 715; 709/204, 205, 709/201, 203, 220, 222, 223, 225, 217, 219, 709/227, 229; 715/751, 753, 755, 759, 969, 715/733, 740, 741, 743, 748, 783, 738, 739
See application file for complete search history.

(56) References Cited

U.S. PATENT DOCUMENTS

| | | | | |
|---|---|---|---|---|
| 5,758,110 | A | * | 5/1998 | Boss et al. .................. 345/751 |
| 5,790,127 | A | * | 8/1998 | Anderson et al. ....... 345/759 X |
| 5,822,525 | A | | 10/1998 | Tafoya et al. .......... 395/200.35 |
| 5,874,960 | A | | 2/1999 | Mairs et al. ................. 345/340 |
| 5,907,324 | A | * | 5/1999 | Larson et al. ............... 345/753 |
| 6,308,199 | B1 | * | 10/2001 | Katsurabayashi ........... 709/204 |
| 6,411,989 | B1 | * | 6/2002 | Anupam et al. ............ 709/204 |
| 6,473,785 | B1 | * | 10/2002 | Mizuno et al. ............. 709/205 |

* cited by examiner

*Primary Examiner*—Raymond J. Bayerl

(57) ABSTRACT

An interface is provided for application sharing. An interface program facilitates application sharing by reducing it to a two step process hiding underlying details from a user. This interface program in cooperation with a conferencing program facilitates application sharing by enabling a user to select one or more files and one or more participants. Subsequently, this interface program automatically establishes application sharing. This interface program provides both an application list and a participant list to facilitate a user's selection thereof.

39 Claims, 14 Drawing Sheets

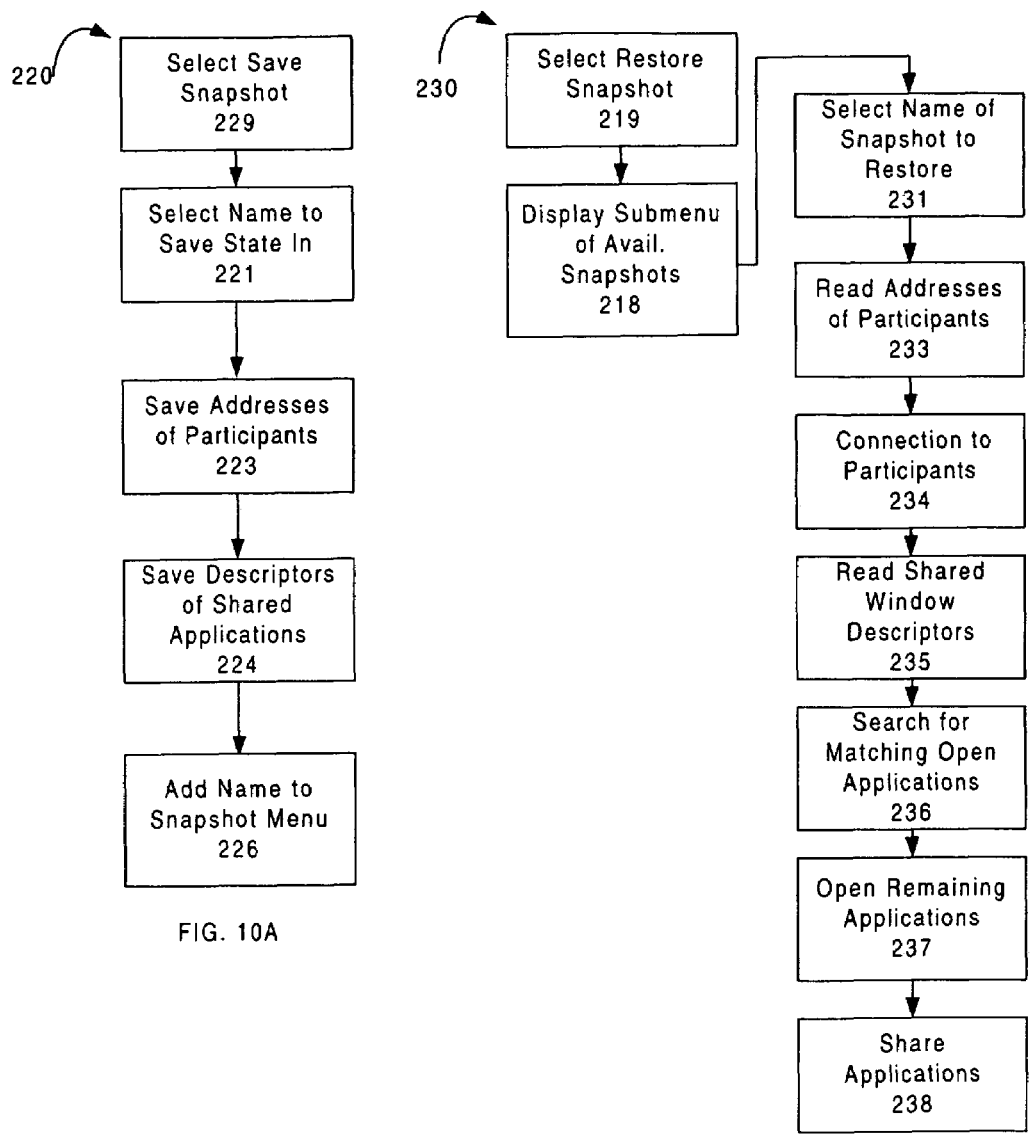

METHOD AND APPARATUS FOR APPLICATION SHARING INTERFACE

FIELD OF THE INVENTION

This invention relates generally to an interface program for sharing an application program between two or more computers and, more specifically, to an interface program to an underlying conferencing program having an application sharing capability.

BACKGROUND OF THE INVENTION

Computer systems and associated peripheral devices are often operatively coupled to one another to enable electronic communication. This involves a network such as a local area network (LAN), a wide area network (WAN), a portion of the Internet, or any combination thereof. Such computer systems conventionally comprise an operating system such as UNIX including without limitation variants of UNIX, WindowsNT, Windows98, Windows CE, and variants of Windows. Such computer systems further include application programs. These application programs may reside on such computer systems or may reside on one or more application servers for use on small computer systems.

Some application programs allow a computer system user to contemporaneously share electronic media with users of other computer systems ("application sharing"). This is conventionally referred to as, "What you see is what I see" (WYSIWIS). These programs conventionally comprise some level of conferencing capability. Such programs include without limitation NetMeeting from Microsoft Corp., Redmond, Wash., and ProShare from Intel Corp., Santa Clara, Calif. NetMeeting and ProShare each comprise an application sharing capability. WYSIWIS is a substantially real-time shared viewing on separate computer systems. By "substantially real-time shared viewing," is meant WYSIWIS with some amount of propagation delay.

Unfortunately, these conferencing programs require knowledge on how to use them for conferencing and require knowledge on how to configure them for application sharing. For example, in NetMeeting, a document, if not already open, must be found and opened. This will open an associated application program. After which, NetMeeting must be found and opened. NetMeeting provides a capability of creating a list of names (a directory) or a list of numbers (speed dial list). So, either a name or a number is selected from a list for an instantiation of NetMeeting. After a connection is established, a share menu becomes available. The share menu lists open documents available for sharing. A presenter of a host computer system may then select a document to be shared with an audience member or members of a shadow computer system or systems. ProShare also requires knowledge of how to use it for conferencing and for sharing applications.

Accordingly, it would be desirable to enable a user to share applications without having to have any knowledge of an underlying application. Thus, an application-sharing interface is needed which is easier to use than those heretofore.

SUMMARY OF THE INVENTION

The present invention provides method and apparatus for an application-sharing interface. More particularly, an aspect of the present invention is an interface program for application sharing. This interface program facilitates application sharing by reducing prior art complexity associated therewith. In particular, this interface program allows application sharing to be minimally established by selecting one or more documents to be shared and one or more participants with whom to share such one or more documents. After which, connectivity and any associated activity is automatically initiated.

An aspect of the present invention are routines which facilitate application sharing. Another aspect of the present invention is a windows update routine which facilitates generating an application list of window titles. Another aspect of the present invention is event handling, which may be used to provide participant count information. Another aspect of the present invention are routines for storing and restoring configuration of an application-sharing event. Another aspect of the present invention is routines for adding, changing, and removing participant listings from a participant list, which facilitates such adding, changing and removing whether currently engaged in an application-sharing event or not. Another aspect of the present invention is a client-server system employing a server interface program for providing an application-sharing service.

These and other features, advantages, objects and embodiments of the present invention will become more apparent from reading the following Detailed Description of the Preferred Embodiments or by practicing the present invention.

DESCRIPTION OF THE DRAWINGS

The features of the present invention, as well as objects and advantages, will best be understood by reference to the appended claims, detailed description and accompanying drawings where:

FIGS. 10A and 10B are block diagrams of exemplary embodiments of routines for saving and restoring a session, respectively, in accordance with the present invention.

In the drawings, same reference numbers refer to like components throughout the several figures.

DETAILED DESCRIPTION OF THE PREFERRED EMBODIMENTS

In the following detailed description, reference is made to the accompanying drawings which form a part of this detailed description, and in which, shown by way of illustrative example, specific embodiments are described. These exemplary embodiments are described in sufficient detail to enable those of skill in the art to practice the present invention. However, it is to be understood that other embodiments of the present invention not described herein in any detail may be utilized. Therefore, the following detailed description is not to be taken in a limiting sense.

Figure 1:
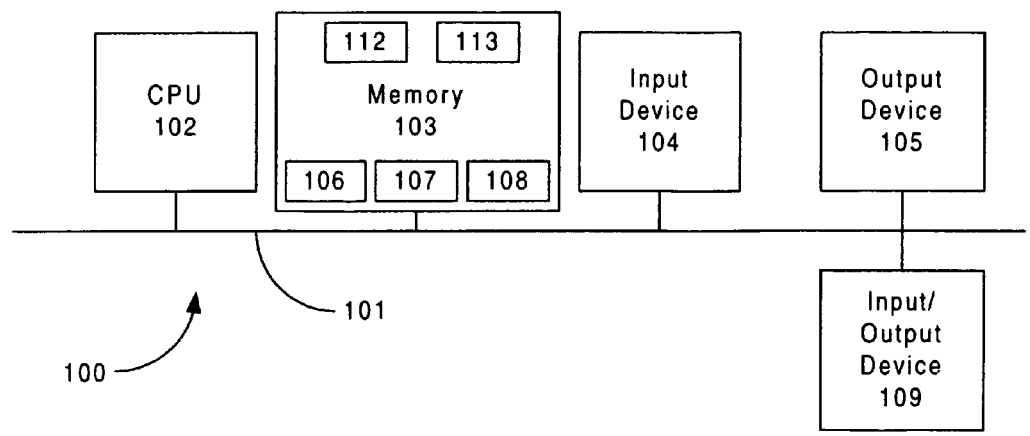
FIG. 1 is a block diagram of an exemplary portion of an embodiment of a computer system in accordance with the present invention.

Referring to FIG. 1, there is shown a block diagram of an exemplary portion of an embodiment of a computer system 100 on which an interface program 108 may be executed. Computer system 100 comprises bus 101, central processing unit (CPU) 102, memory 103, input/output devices 104. Memory 103 comprises operating system 106, application programs 107, one or more documents 113, conferencing program 112 and interface program 108. Though memory 103 is illustratively shown separate from CPU 102, a portion of memory 103 may be part of CPU 102. CPU 102, memory 103, input device 104 and output device 105 are illustratively shown operatively coupled via bus 101. Bus 101 comprises an address bus, a control bus and a data bus. Input device 104 may comprise one or more input devices, including without limitation a keyboard, a cursor pointing device, a scanner, a video camera, a microphone, and the like. Output device 105 may comprise one or more output devices, including without limitation a display device having a screen display, a printer, and the like. Input/output device 109 comprises one or more input/output devices, including without limitation a modem, a network interface, and the like. Notably, many other well-know configurations may be employed for computer system 100.

By way of example and not limitation, computer system 100 comprises at least one operating system 106, such as UNIX including without limitation variants of UNIX, WindowsNT, Windows98 or Windows CE including without limitation variants of Windows, and any of a variety of applications for creating one or more documents. By document, it is meant any electronic form of media, including without limitation an electronic version of a spreadsheet, word processing text, picture, slide, video, audio, and the like. Conferencing program 112 may be a conferencing program such as NetMeeting, ProShare, and the like configured for application sharing.

Accordingly, it should be understood that any of a variety of operating systems, application programs and conferencing programs may be used, so for purposes of clarity a preferred embodiment employing a computer system having a Microsoft Windows98 operating system, Microsoft Word application program and Microsoft NetMeeting configured for application sharing is described elsewhere. Microsoft's Windows98 and NetMeeting provide an underlying infrastructure for manipulating and sharing applications and for providing certain graphical user interface (GUI) elements. However, other same or similar infrastructures may be used.

Figure 2:
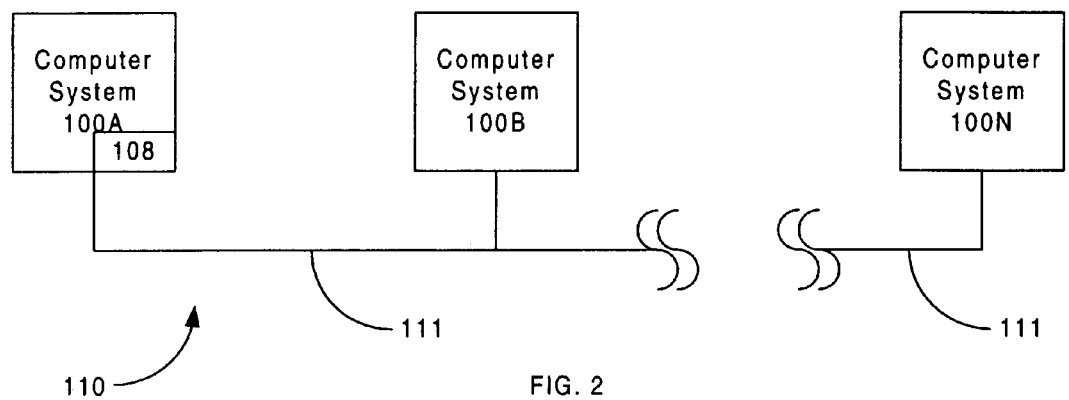
FIG. 2 is a block diagram of an exemplary portion of an embodiment of a network in accordance with the present invention.

Referring to FIG. 2, there is shown a block diagram of an exemplary portion of an embodiment of a computer network 110 on which interface program 108 may be executed. By computer network, it is meant more than one computer system operatively coupled to one another via one or more communication links 111. Communication link 111 may comprise any of a number of connection types, including without limitation cellular, satellite, phone line, cable TV line, local area network (LAN), wide area network (WAN), and the like. Computer systems 100B to 100N are shadow computer systems to host computer system 100A. These shadow computer systems 100B to 100N have a program, such as NetMeeting, ProShare, and the like, with an application-sharing capability. Though host computer system 100A comprises interface program 108, shadow computer systems 100B to 100N may or may not have it. Accordingly, it should be understood that any of a variety of computer systems including any of a variety of operating systems, application programs, and application-sharing programs may be used for such shadow computer systems. So, for purposes of clarity, a preferred embodiment employing at least one shadow computer system 100B having a Microsoft Windows98 operating system and Microsoft NetMeeting configured for application sharing is described herein below. Accordingly, computer systems 100A, 100B and 100N are compatible with one another for alternative invocations.

Figure 3:
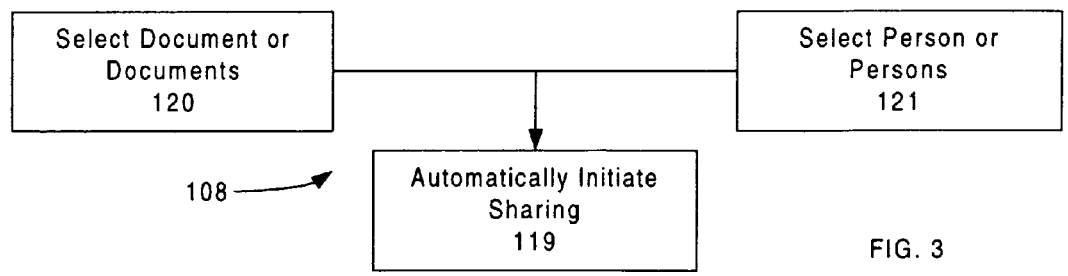
FIG. 3 is a block diagram of exemplary embodiments of application-sharing processes in accordance with the present invention.

In FIG. 3, a block diagram of application sharing using interface program 108 is illustratively shown. Interface program 108 minimally uses two user steps for invoking application sharing; accordingly, in any order selecting one or more documents 120 and selecting one or more persons 121. Notably, a set of documents or a set of persons may be selected to avoid having to select individual documents or participants.

Because interface program 108 provides a separate interface from an underlying conferencing application, application sharing without user knowledge of this underlying conferencing program is facilitated by automatically initiating/establishing application sharing 119, including without limitation substantially real-time shared viewing. In other words, a conferencing program interface may be made "transparent" to a user. Accordingly, interface program 108 may include a user selectable command to hide a user interface for such an underlying conferencing program. Moreover, this leads to a benefit of requiring fewer steps than previously required. Furthermore, as will become apparent, establishing an application-sharing event while providing relevant status information associated therewith is accomplished using a single status window.

Application Startup

Figure 4:
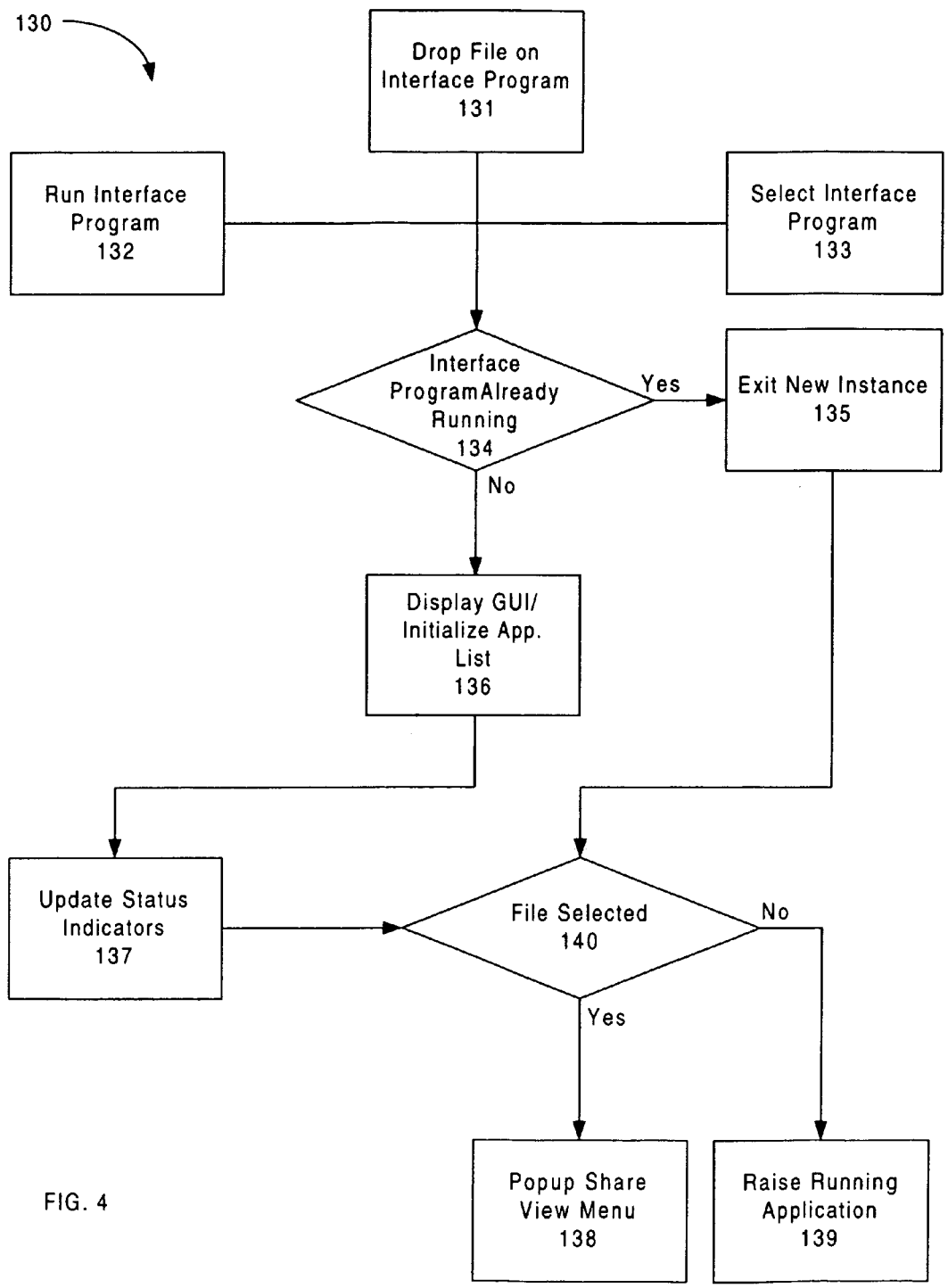
FIG. 4 is a flow diagram of an exemplary embodiment of a startup routine in accordance with the present invention.

Referring now to FIG. 4, there is shown a flow diagram of an exemplary 11 embodiment of a startup routine 130 in accordance with the present invention. Shown are three separate approaches to initiate startup program 130. At "Run Interface Program" 132, an executable version of interface program 108 may be conventionally invoked, such as double-clicking on an executable file or typing at a command line. At "Drop File on Interface Program" 131, a document file is dragged and dropped on an interface program 108 icon. At "Select Interface Program" 133, an interface program 108 command option is selected from a popup menu activated by a "right click" of a cursor pointing device on an object displayed on a screen display, such object may be part of a "desktop" or file manager.

At decision "Interface Program Already Running" 134, a determination is made as to whether a prior instantiation of interface program 108 is currently active.

If interface program 108 is currently running, then any subsequently attempted initiation 131, 132, or 133 is exited at "Exit New Instance" 135. A user interface and applicant list of this currently running interface program 108 is used.

Figure 5A:
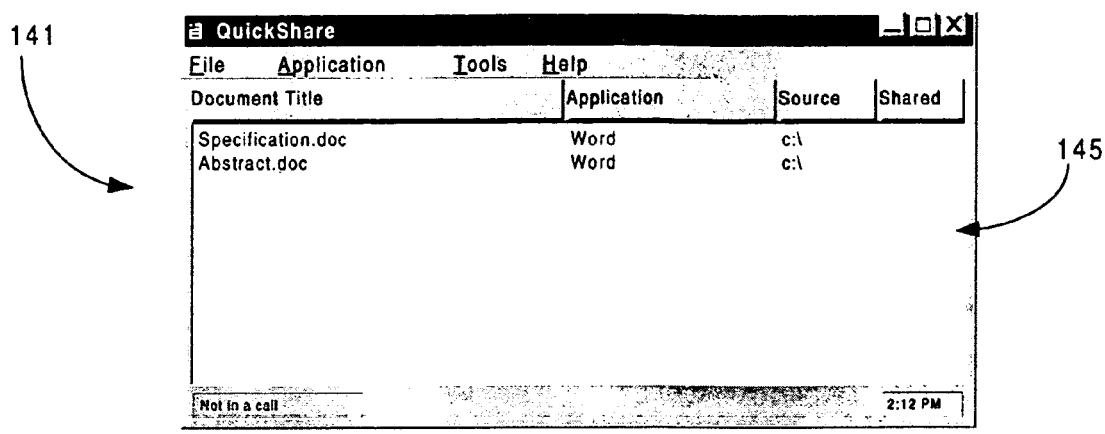
FIGS. 5A through 5C, inclusive, are pictorial diagrams of exemplary embodiments of graphical user interfaces in accordance with the present invention.

If interface program 108 is not currently running, then at "Display GUI/Initialize Window List" 136, an interface program 108 user interface, preferably a GUI, is displayed having an application list. At "Update Status Indicators" 137, status indicators are updated as needed to reflect a current state of any ongoing connections as described herein below. This application listing may list one or more selectable documents or windows titles. By way of example and not limitation, a GUI 141 having an application list 145 with document titles is illustratively shown in the pictorial diagram of FIG. 5A.

Figure 5B:
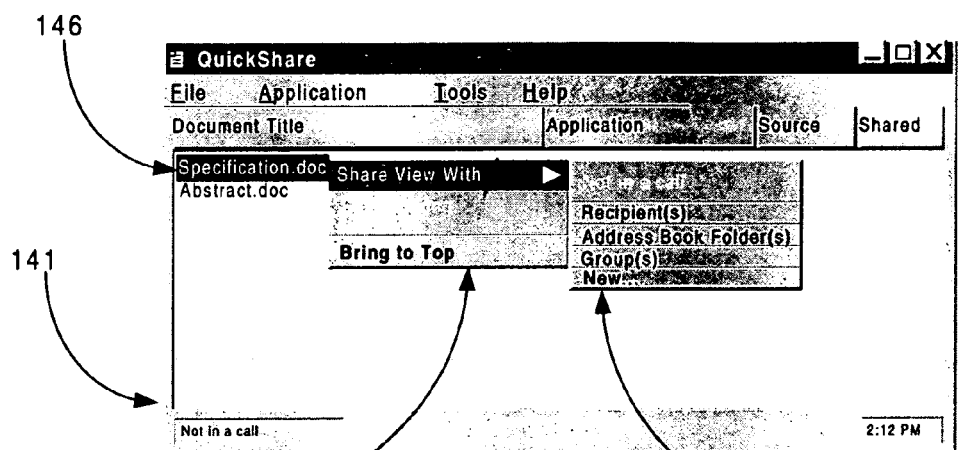

At decision "File Selected" 140, it is determined whether a file from an application list to be shared has been selected. If a file has been selected, then a popup share view menu, and optionally a participant list, is opened at "Popup Share View Menu" 138. By way of example and not limitation, a popup share view menu 142 and a participant list 143 for a selected document file 146 is illustratively shown in the pictorial diagram of FIG. 5B. If engaged in sharing an application, a "Stop Sharing" command, shown in FIG. 5B, would be active, allowing a host user to stop sharing of a selected document.

In an embodiment, by selecting one or more "Recipient(s)," "Group(s)" or "All" in a participant list, sharing may be immediately initiated. "New" brings up an address book for entering a new recipient to a participant list. Accordingly, such an address book has a user selectable field for toggling between adding or not adding an entry to such a participant list. "All" is active when sharing is ongoing, and allows a user to share a selected application or document with everyone sharing after checking to see if such application or document is already shared. If no connected call is ongoing, then a "Not in a call" indicator appears.

If at decision "File Selected" 140 no file has been selected, then at "Raise Running Application" 139 a user interface, for example GUI 141, is placed at the front of a display as an active view.

Update Window List

Figure 6:
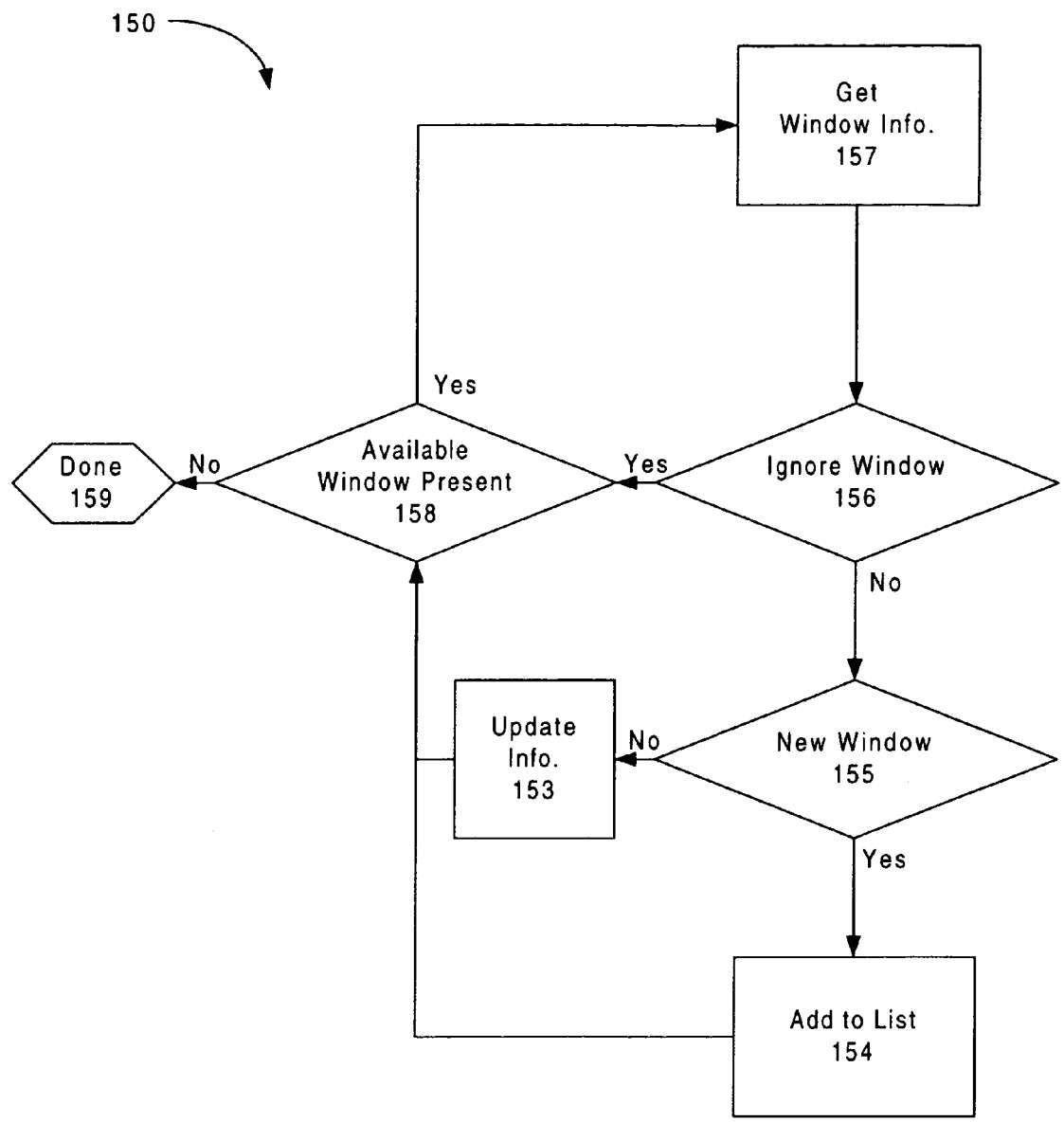
FIG. 6 is a flow diagram of an exemplary embodiment of an update routine in accordance with the present invention.

Referring now to FIG. 6, there is shown a flow diagram of an exemplary embodiment of update routine 150 in accordance with the present invention. Update routine 150 is for generating a window list by filtering available windows and listing those that appear to correspond to shareable objects. Update routine 150 may be used to generate an initial list of shareable objects or may be used to update a list of shareable objects.

Figure 5C:
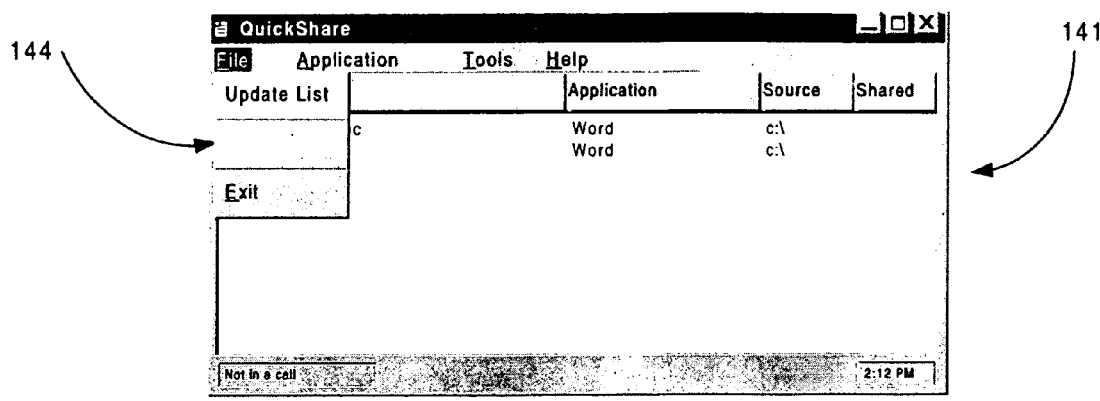

Updating may be user configured with respect to update frequency. By way of example and not limitation, a user may set update routine 150 to run every five seconds in a background mode. Alternatively, an "Update List" command may be invoked from a pull-down menu 144 as illustratively shown by way of example and not limitation in the pictorial diagram of FIG. 5C.

Update routine 150 iterates through available windows, selecting and displaying information for certain of them. More specifically, update routine 150 employs a capability of an underlying operating system to iterate through information about each window. This information may comprise a window's title, visibility (whether hidden or not) and unique identification ("ID"). Additional information that may be obtained includes a window's source (for example, local computer, networked computer, shared view, or workspace) and if available, information about an associated file or application program.

At decision "Available Window" 158, update routine 150 determines whether at least one window is available for processing. If a window is available for processing, information for such window is obtained at "Get Window Info." 157.

At "Ignore Window" 156, it is determined whether this obtained information is to be ignored. A set of heuristics is used to determine whether to display information about a window or document. By way of example and not limitation, a set of heuristics may include:

Window visible (system windows are conventionally hidden).

Window title contains "-" (assumed to separate document and application names.

Document name precedes "-", application name follows (standard convention).

Some applications reverse this standard convention, so
   if a document name contains "NetMeeting", "Exploring", "Microsoft" or "Eudora", then document and application names are swapped unless such document name also includes "Explorer".
   if application name contains ":\" (part of a pathname), then replace it with just its root filename.

Remove designated strings from application name. This may be user configurable. An example of a string that a user may decide to remove is "Microsoft".

Do not list windows whose application name contains "Exploring" or "NetMeeting". This may be user configurable.

Optionally, add a filter, which may be user configurable, to avoid particular document names or portions thereof.

If this window is to be ignored, then a check for another available window is made at "Available Window" 158.

If this window is not to be ignored, then it is determined whether it is already listed at "New Window" 155 by comparing unique ID's. If a unique ID is already on this generated window list of shareable objects, then window information to be displayed may be updated, if different, at "Update Information" 153. If a unique ID is not already on this generated window list of shareable objects, then such object, including associated information, is added to this generated window list at "Add to List" 154.

After adding at 154 or any updating at 153, an inquiry is made at "Available Window" 158 as to whether there is another yet unprocessed window. If there is no other as yet unprocessed window, update routine 150 exits at "Done" 159; otherwise, update routine 150 continues at "Get Window Info." 157. Accordingly, update routine 150 continues until there are no more unprocessed windows.

A user may designate one or more windows to ignore. Moreover, a user may designate whether to view information in such an application listing by title of shareable window or document. In a window title list mode, windows are listed by window frame title. In a document title list mode, documents are listed by document title, and a separate column for an associated application may be included. While not wishing to be bound by theory, it is anticipated that a listing by document title will be shorter and will be subject to less inadvertent sharing. Inadvertent sharing may occur owing to designating an "Explorer" window, such as "My Computer" or a folder, wherein all open windows will be shared, or owing to starting a new application in a window while still in a meeting. On the other hand, if a host user would like to share many documents at one time or to add one or more documents during a conference, then an application list by window may be desirable.

Planned Sharing

The terms "planned sharing" and "ad hoc sharing" as used herein refer to different contexts in which an object is selected for sharing, namely, respectively when an object is selected for sharing before it is opened and when an object is selected for sharing after it is opened.

Figure 7:
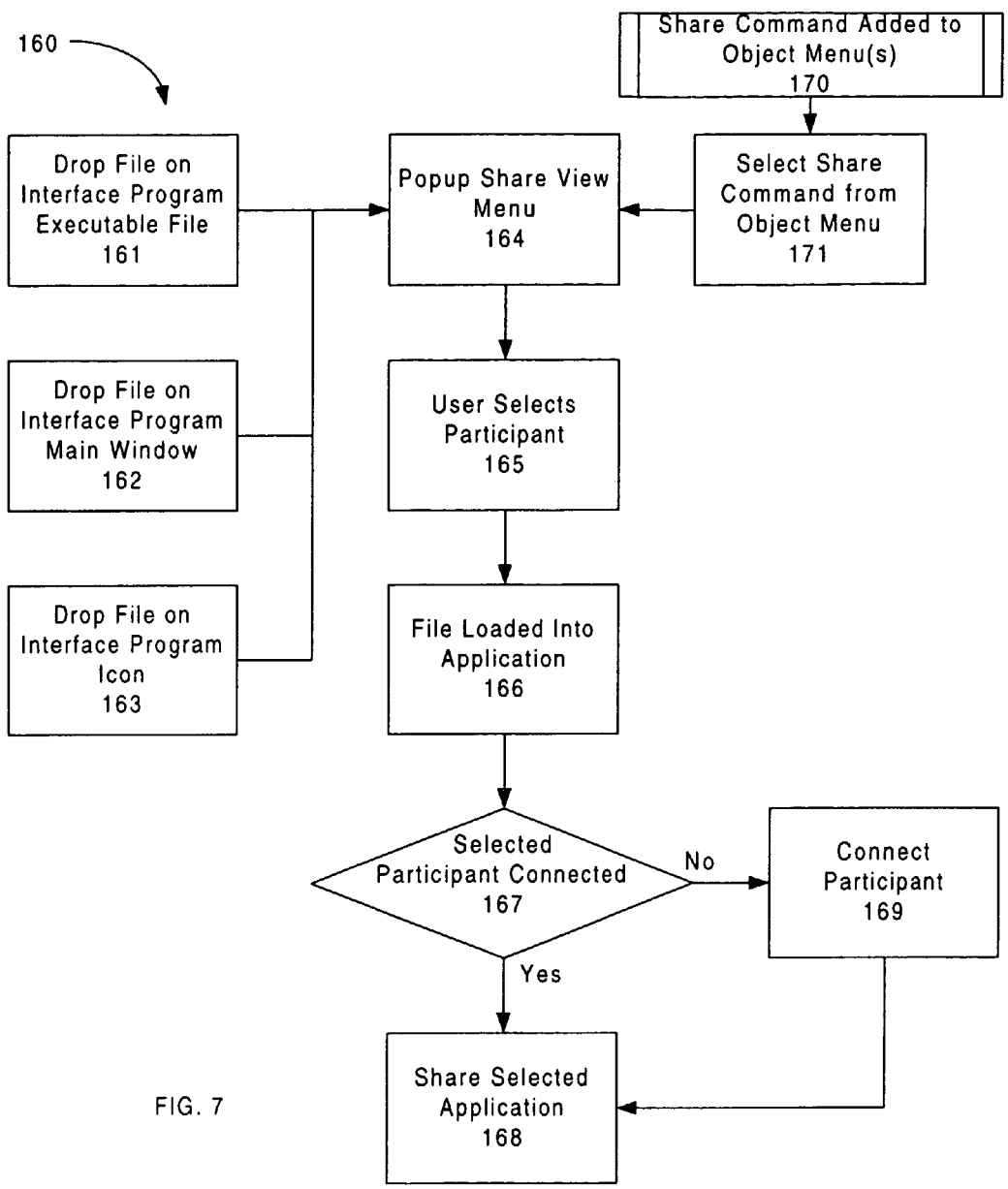
FIGS. 7 and 8 are flow diagrams of exemplary embodiments of sharing routines in accordance with the present invention.

Referring now to FIG. 7, there is shown a flow diagram of an exemplary embodiment of planned sharing routine ("PS routine") 160 in accordance with the present invention. PS routine program 160 may be initiated by dropping one or more files on an interface program 108 executable file, main window or icon, namely invocations 161, 162 and 163, respectively.

With continuing reference to FIG. 7, an interface program 108 command may be added to object menus at "Interface Program Command Added to Object Menus" 170. Such addition may be done by "right-clicking" on a file on a Windows desktop, in Windows Explorer, or in other similar locations having an "Open" command in a menu. Accordingly, a command called "Share" may be added to such menus. Thus, PS program 160 may be initiated by right-clicking on a document object to invoke an object menu, and then selecting a "Share." command from this object menu at "Select Share from Object Menu" 171.

Figure 5D:
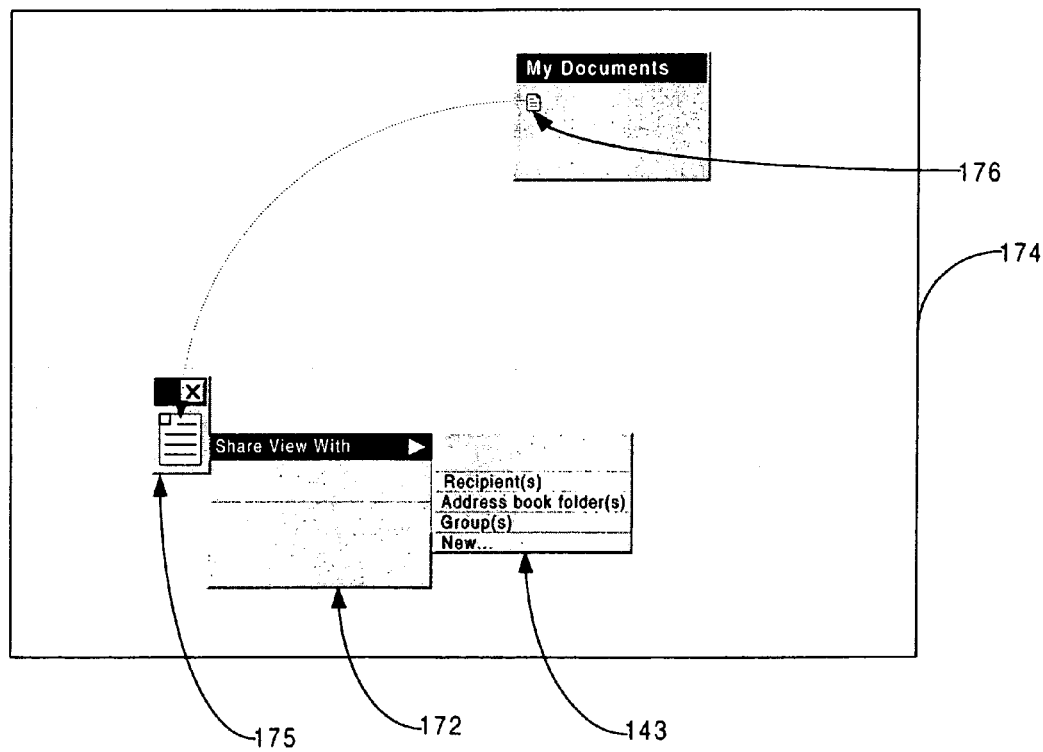
FIG. 5D is a pictorial diagram illustratively showing a document icon dragged and dropped onto a program icon to invoke a popup share view menu and a participant list on a display in accordance with an exemplary embodiment of the present invention.

After initiating, a menu is provided at "Popup Share View Menu" 164. This menu may popup at a location where sharing was initiated. By way of example and not limitation, in FIG. 5D there is illustratively shown a document icon 176 dragged and dropped onto a interface program icon 175 to invoke a popup share view menu 172 and a participant list 143 on a host's screen display 174.

After "Popup Share View Menu" 164, a user may select one or more participants from a participant list at "User Selects Participant" 165. Such a participant list may be generated by accessing an address book, directory listing, speed dial listing, or the like.

As interface program 108 is invoked by effectively selecting a file or files to share, any such selected files are loaded into their respective application program at "File Loaded Into Application" 166.

At inquiry "Selected Participant Connected" 167, it is determined which, if any, selected participants are not already part of any ongoing call. If there is no ongoing call, then NetMeeting is activated and a call is made to a selected participant to attempt to establish a connection at "Connect Participant" 169. If there is an ongoing call and a selected participant is not currently part of that ongoing call, then a call is made to such participant to attempt to establish a connection at "Connect Participant" 169. Information for placing such a call may be found by accessing an address book, directory listing, speed dial listing, or the like. If a selected participant is already connected, then they may share a selected application at 168.

At "Share Application" 168 a participant list is updated and each participant connected to a host computer may view any and all designated files for sharing. Moreover, manner of sharing may be user designated, namely "shared viewing" or "shared editing." By "shared viewing," it is meant that an audience member may view but cannot edit a shared document. By "shared editing," it is meant that an audience member may view and edit a shared document. In an embodiment, once shared viewing is established, a host user may change status to shared editing. In an embodiment, an indicator is placed in an upper left corner of a window to indicate it is shared along with a host name.

Ad Hoc Sharing

Figure 8:
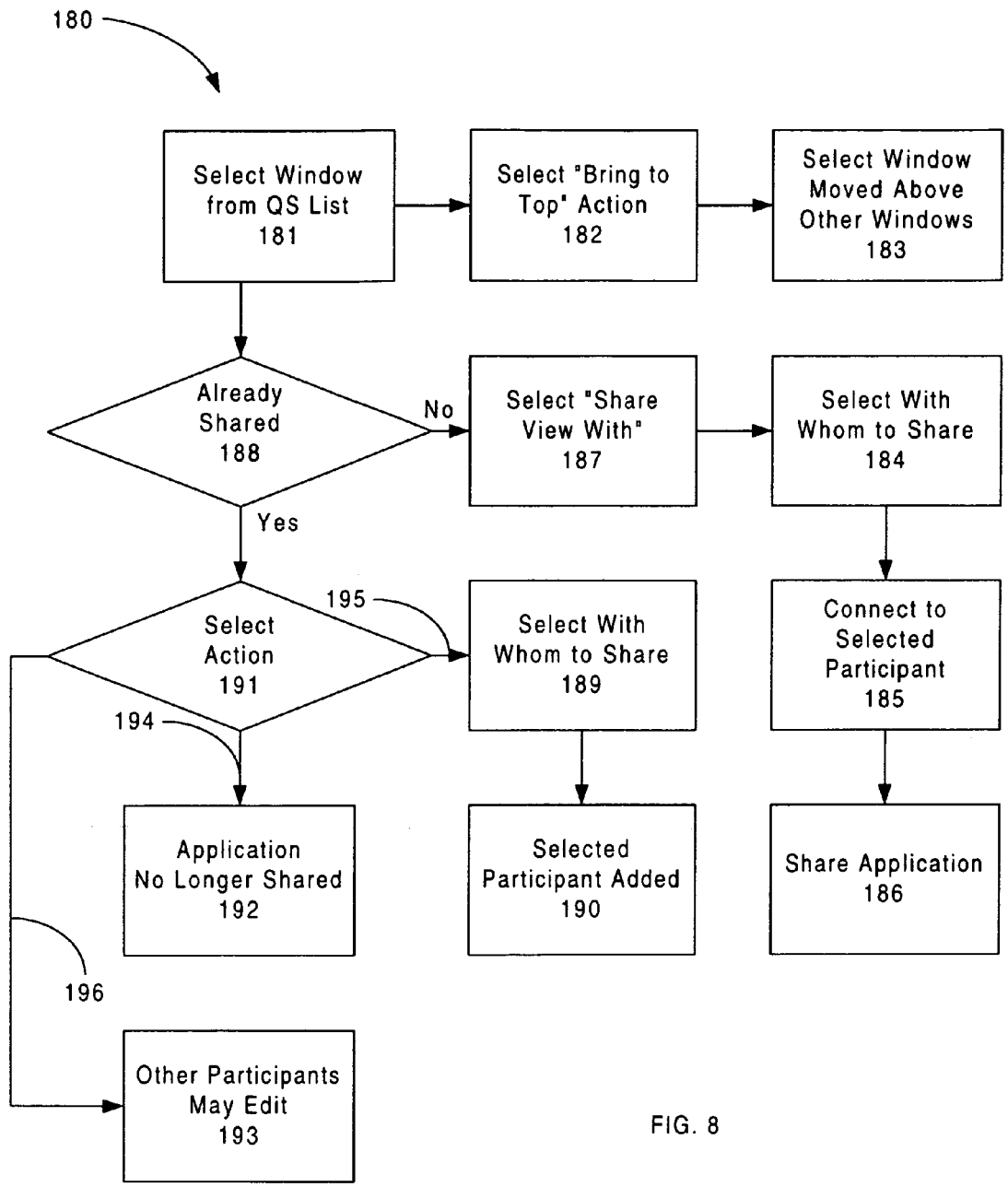
Figure 11A:
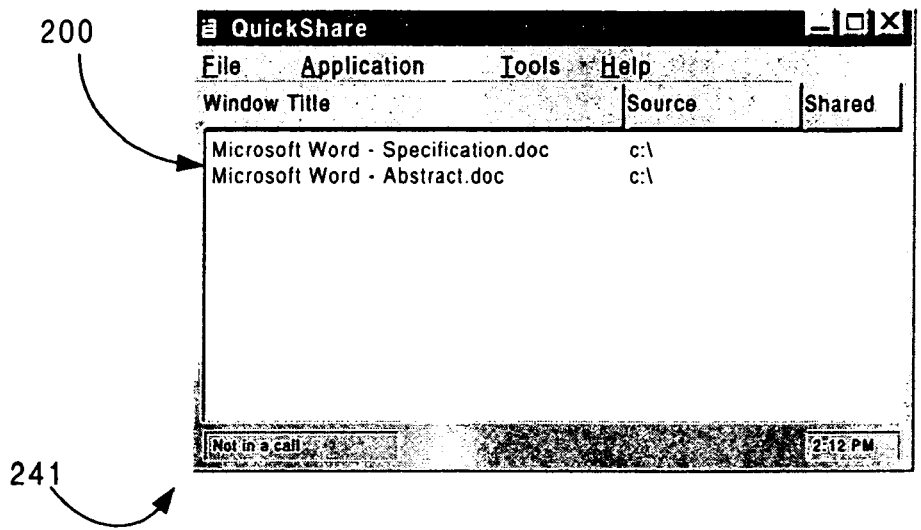
FIG. 11A through 11F, inclusive, are pictorial diagrams of exemplary embodiments of graphical user interfaces in accordance with the present invention.
Figure 11B:
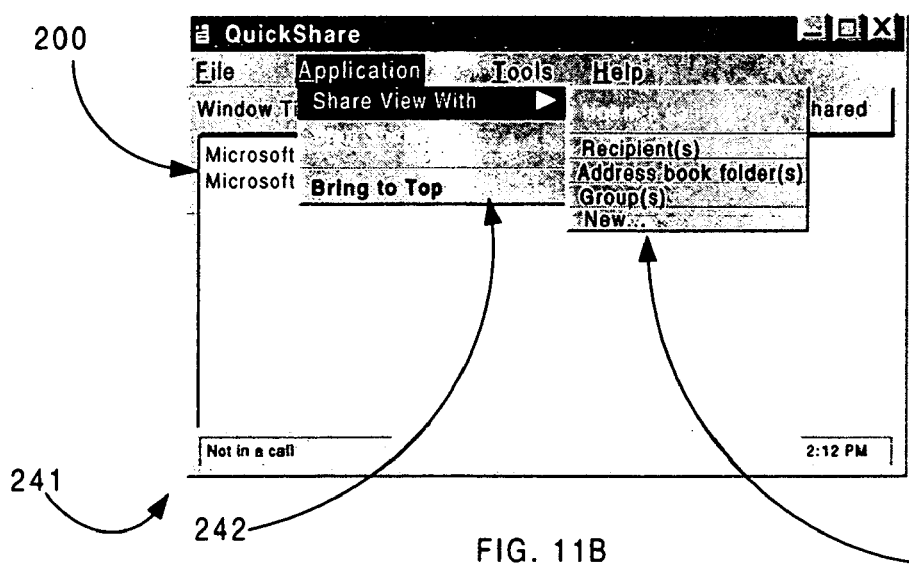

Referring now to FIG. 8, there is shown a flow diagram of an exemplary embodiment of "ad hoc" sharing routine ("AHS routine") 180 in accordance with the present invention. A window is selected from a window list at 181. By way of example and not limitation, in FIG. 11A there is illustratively shown a GUI 241 having a window list 200. GUI 241 is similar to GUI 141 of FIG. 5A, except that window titles are provided instead of document titles and no separate listing of application information appears. Once a window is selected, a user may select to display that window as a front image on a screen display at 182. If so, this selected window is moved in front of any other windows on such a screen display at 183. By way of example and not limitation, a "Bring to Top" selection may be part of a pull-down share view menu 242, as illustratively shown in FIG. 11B.

If a selected window from a window list is not currently shared as determined at 188, a user may choose to "ad hoc" share such window by pulling down a share view menu at 187 and then selecting with whom to share such window at 184. By way of example and not limitation, a pull-down share view menu 242 and a participant list 143 are illustratively shown in FIG. 11B. Any selected participants may then be connected at 185, using connection information, as previously described herein, and an application may be shared with any of these selected participants at 186.

Figure 11C:
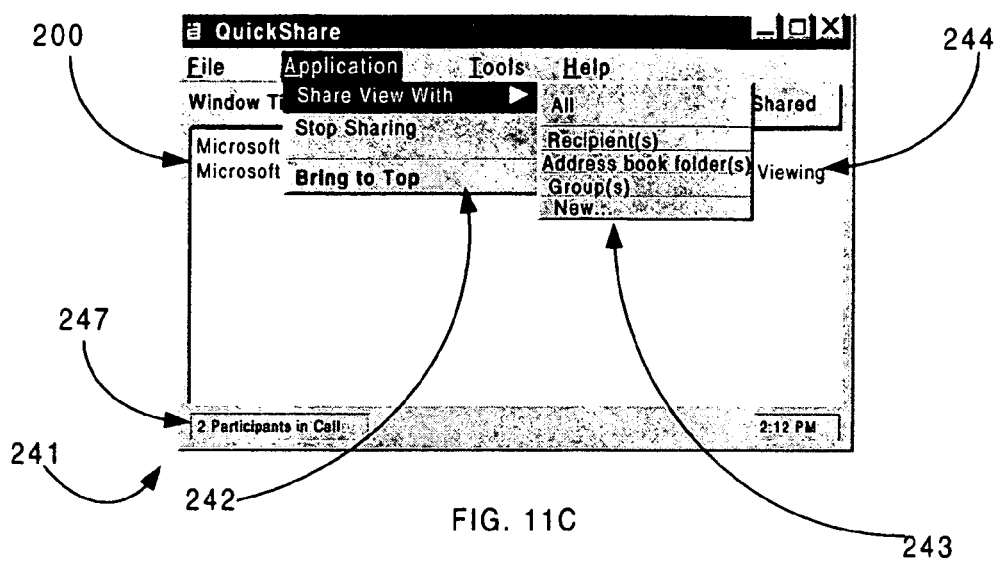

If a selected window from a window list is currently being shared as determined at 188, then a user may choose from several different actions at 191. If branch 195 is selected, a user decided to share viewing with another participant. Accordingly, a user may select with whom to share viewing at 189 and such selected participant may be added to this ongoing sharing at 190, including establishing a connection. By way of example and not limitation, a pull-down share view menu 242 and a participant list 243 are illustratively shown in FIG. 11C having ongoing shared viewing of a document as indicated by an associated "Viewing" status indicator 244. Furthermore, a participant counter 247, as illustratively shown in FIG. 11C, may be used to provide an indication of two or more participants. Participant counter 247 may be incremented or decremented as described elsewhere herein. Moreover, participant counter 247 may contextually indicate other information associated with call placement, such as dialing, dialing number, calling, busy, connecting, and the like.

Figure 11D:
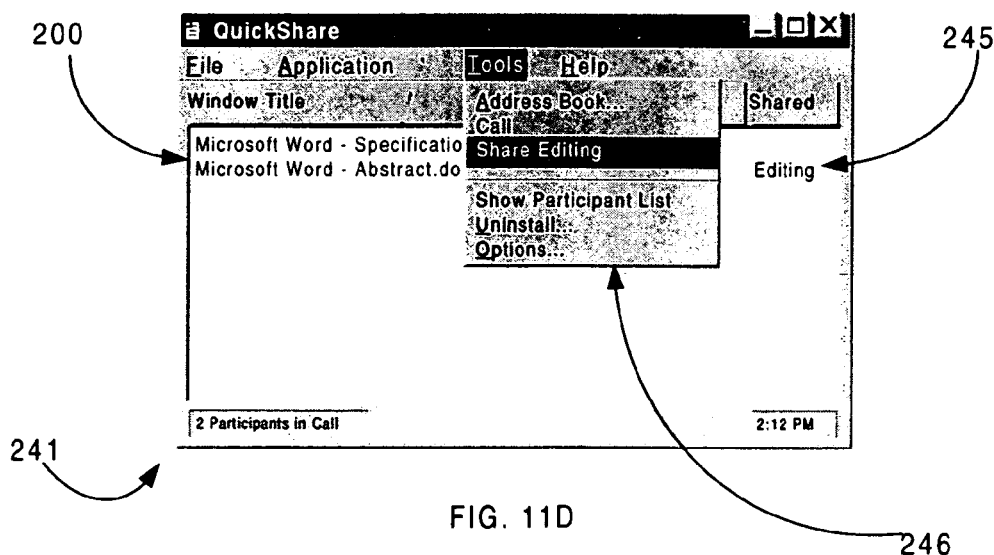
Figure 11E:
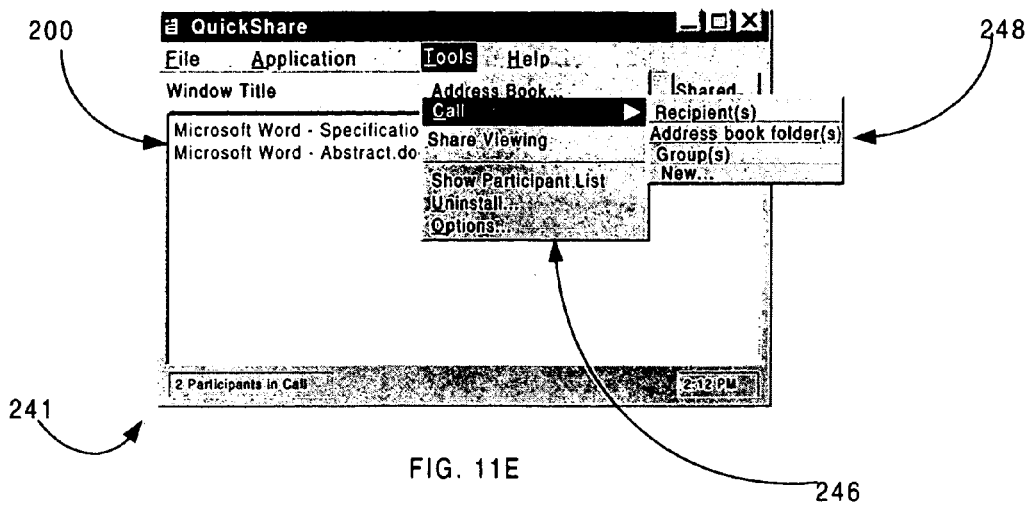

Alternatively at select action 191, a user may decide to allow a participant to share editing by selecting branch 196, and thus change status to shared editing at 193. By way of example and not limitation, as illustratively shown in FIG. 11D, a pull-down tools menu 246 and window listing 200 may have a command that is toggled between "Shared Viewing" (illustratively shown in FIG. 11E) and "Shared Editing." In FIG. 11D, sharing status of an ongoing call is indicated by an associated "Editing" status indicator 245.

Alternatively at select action 191, a user may select a "Stop Sharing" command (illustratively shown in FIG. 11C) by selecting branch 194, and thus terminate sharing at 192.

Event Handling

Figure 9A:
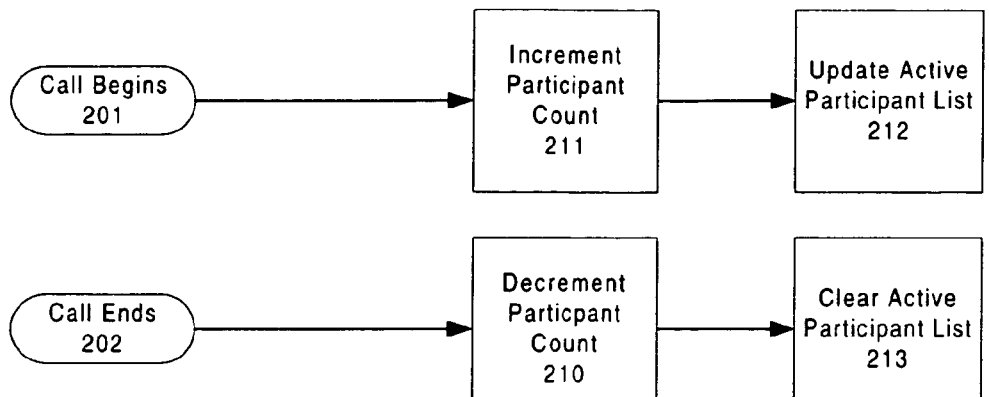
FIGS. 9A through 9C, inclusive, are flow diagrams of exemplary embodiments of event handling flows in accordance with the present invention.
Figure 9B:
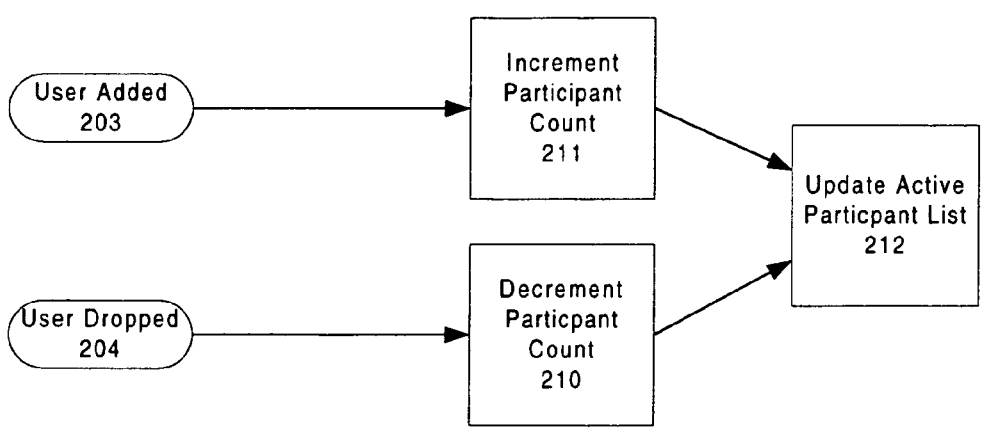
Figure 9C:
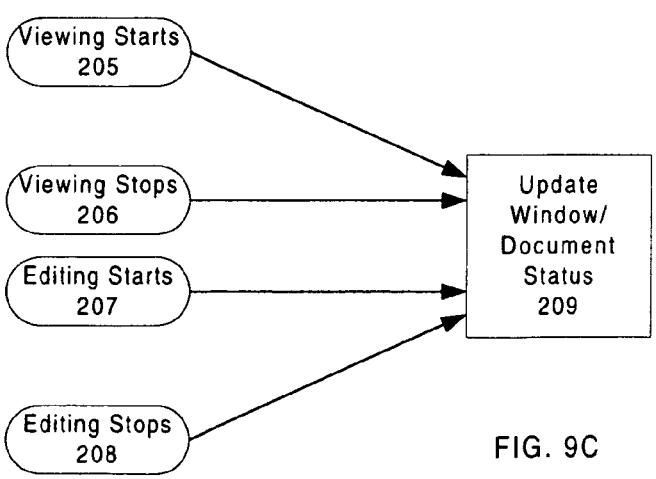

Referring now to FIGS. 9A through 9C, inclusive, there are shown flow diagrams of exemplary embodiments of event handling in accordance with the present invention. As interface program 108 is interacting with an underlying communication system having some asynchronous behavior, it is configured to respond to certain events, namely Call Begins 201, Call Ends 202, User Added 203, User Dropped 204, Viewing Starts 205, Viewing Stops 206, Editing Starts 207 and Editing Stops 208.

Prior to any ongoing call, if a host user begins a call 201, then participant count is incremented at 211 and a participant list is updated at 212. If a host user ends a call at 202, then participant count is decremented at 210 and this participant list is cleared at 213. It should be noted that "sub-hosting" may be included. By "sub-hosting," it is meant that if an audience member would like to add another entity to a meeting, they may do so. Thus, such an audience member becomes a sub-host with respect to a host user. Participant count is incremented or decremented, as applicable, on a participant list whether originally included by a host or a sub-host.

Figure 11F:
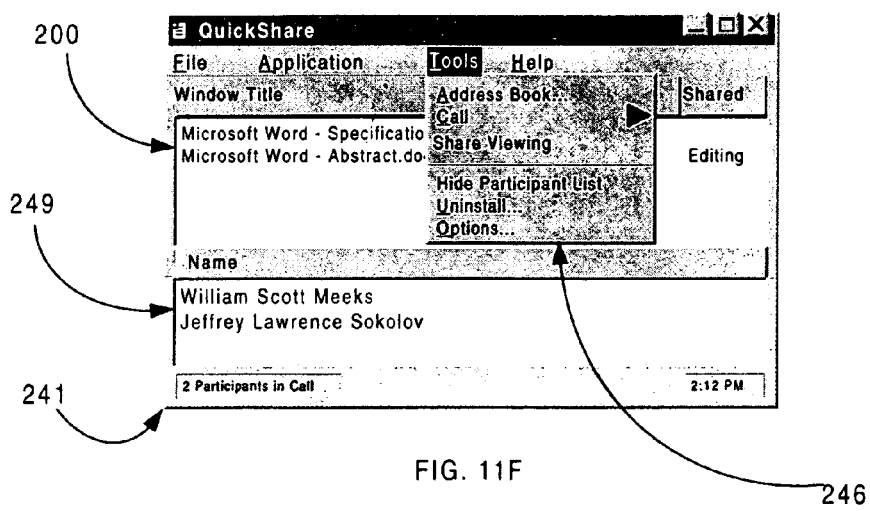

For an ongoing call, if an audience member is added at 203, then participant count is incremented at 211. If an audience member is dropped at 204, then participant count is decremented at 210 and this participant list is updated at 212. An audience member may be connected during an ongoing call using a "Call" command from pull-down tools menu 246 and a participants list 248 as illustratively shown in FIG. 11E. Moreover, a "Show Participants List" command may be invoked to show a list of participants in a meeting, including any additional information from a respective address book entry, as illustratively shown as participant list 249 in FIG. 11F.

If viewing starts at 205 or stops at 206, then a window or document list is updated for any and all selected shared viewing of items on said list.

If editing starts at 207 or stops at 208, then a window or document list is updated for any and all selected shared editing of items on said list.

"Snapshots"

Referring now to FIGS. 10A and 10B, there are shown block diagrams of exemplary embodiments of session saving routine 220 and session restoring routine 230, respectively. By "snapshots," it is meant an ability to save an in-process meeting context. By saving such a context, settings for subsequent same or similar meeting contexts may be initiated therefrom. Accordingly, a snapshot application-sharing meeting configuration contains addresses of meeting participants and descriptors of any and all shared windows or documents, which may include associated shared editing or viewing status information. A snapshot application-sharing meeting configuration may be saved using interface session saving 220 and subsequently restored using interface session restoring 230.

At 229, a user selects a "Save Snapshot" command. This command may be in a pop-up menu, a pull-down menu, or the like. At 221, a user inputs a name to save a state of an ongoing application-sharing meeting configuration. At 223, address information for each active participant is saved, and at 224 descriptors of any and all shared applications are saved for each application involved. This selected name is then saved to its associated application-sharing meeting configuration at 226, which may include saving such name to a menu.

Address information saved at 223 may include a network address, including without limitation an Internet Protocol (IP) address. An address book may be configured with a field for entering other address information, as well as a field for selecting whether an entry is to be added to a "Share View With" menu, or more particularly a participant list. This other address information may comprise one or more fields for a telephone line number, data line number or other number that may be used for establishing data communication with an application-sharing recipient.

To restore a snapshot, a user selects a "Restore Snapshot" command at 219. This command may be in one or more same menus as a "Save Snapshot" command. At 218, a list of available names of snapshots is displayed. This list may be displayed as a submenu to a menu associated with a "Restore Snapshot" command. A name associated with a saved snapshot is selected at 231. Selecting such a name may be automated by employing a well-known calendar or task-scheduling program.

At 233, address information associated with one or more participants is read from a stored application-sharing meeting configuration associated with such a selected name. A connection, or at least attempted connection, is invoked for each of these participants, or at least potential participants, at 234. Descriptors are read from such select application-sharing meeting configuration at 235. These descriptors include information regarding shared windows from prior sharing, including any state information. A search is conducted for matching windows at 236, namely a search is conducted using these shared window descriptors to determine if any of them are already open. Windows that are currently open and match such a descriptor are then shared at 236. For those unmatched shared window descriptors, if any, corresponding files and applications may be opened, or at least attempted to be opened, at 237 and then shared at 238.

Address Book

Figure 12A:
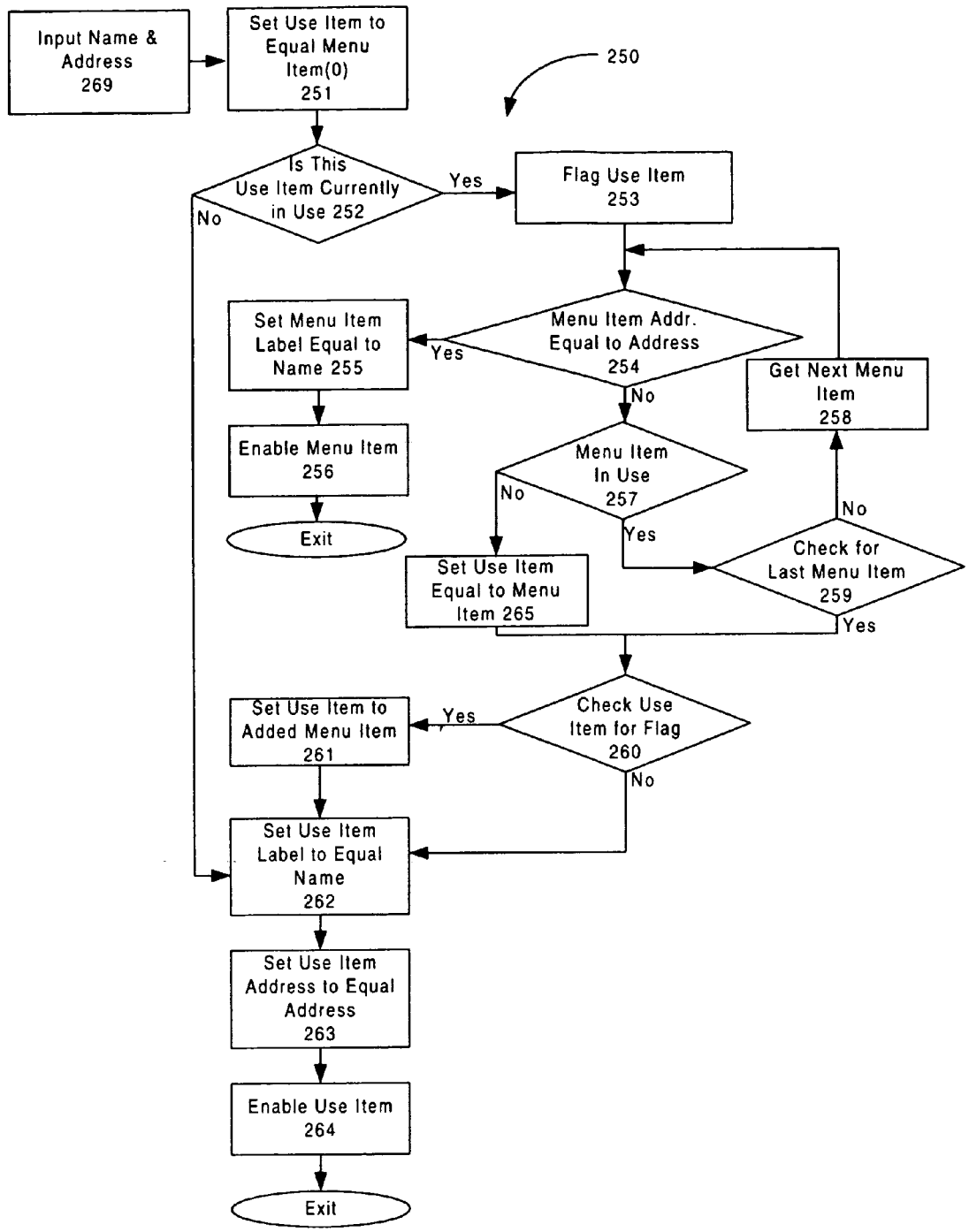
FIGS. 12A and 12B are flow diagrams of exemplary embodiments of participant list routines in accordance with the present invention.

Referring now to FIG. 12A, there is shown a flow diagram of an embodiment of a participant list routine 250. Participant list routine 250 may be used to add or update a participant list associated with a "Share View With" menu or a Call menu. Participant list routine 250 facilitates adding new participant listings during an ongoing application-sharing activity. Moreover, participant list routine 250 may be employed to access information from another directory source of information, such as LDAP, Outlook, and the like, including without limitation corporate directories.

At 269, a "Name" and an associated "Address" is inputted for routine 250. This "Name" is to appear as a "Menu Item" in a menu. Selecting a "Menu Item" associated with this "Name" causes "Address" to be used to ensure a named participant is in a call.

At 251, a "Use Item" is set equal to a "Menu Item." This "Use Item" comprises a name and a network address, and each active "Menu Item" in an array of Menu Items comprises a name and a network address, as illustratively shown in Table I. Preferably, such a network address is an Internet Protocol ("IP") address.

TABLE I

| 0 | Name A | Address A |
| 1 | Name B | Address B |
| 2 | Name C | Address C |
| 3 | Inactive | Inactive |

At 251, Use Item is initialized to Menu Item(O). If necessary, Use Item is set to successive members of Menu Item in an attempt to find an unused existing menu item.

At 252, it is determined whether Use Item is currently in use. By way of example and not limitation, a Use Item is currently in use if it is visible in a participant list menu. If it is determined that such Use Item is not currently in use, then this Use Item is reused or recycled by setting Use Item name equal to Name at 262 and Use Item address equal to Address at 263, and enabling this Use Item at 264. By way of example and not limitation, a Use Item is enabled if it is visible in a participant list menu.

If at 252, it is determined that a Use Item is currently in use, then this Use Item is set to have a Null value or other flag at 253. At 254, a current Menu Item address is checked against Address. If these addresses are equal, then this current Menu Item is updated with Name at 255.

If at 254 a Menu Item address is not equal to Address, then at 257 it is determined if this current Menu Item is currently being used. If it is currently being used, then at 259 a check is made to determine if it is the last Menu Item. If it is not the last Menu Item, a Next Menu Item is obtained at 258 to repeat this process beginning at 254.

If a Menu Item at 257 is currently not being used, then at 265 a Use Item is set equal to this Menu Item. At 262 and 263 a name and a network address for this Use Item is put in this previously established but available Menu Item.

If a Menu Item is currently being used and is the last Menu Item, then at 260 a check is made to determine if this Use Item equals a Null value.

If at 260 Use Item is not Null, then it is equal to an existing but unused Menu Item. So, at 262 and 263, Use Item name and address are updated with Name and Address, respectively. At 264, Use Item is enabled, making this inputted Name visible in a participant list menu.

If at 260 Use Item does equal a Null value, then at 261 a new menu item is added to the Menu Item array. Use Item is set equal to this new menu item. At 262 and 263, Use Item is updated with Name and Address, as previously described, and then enabled at 264.

Figure 12B:
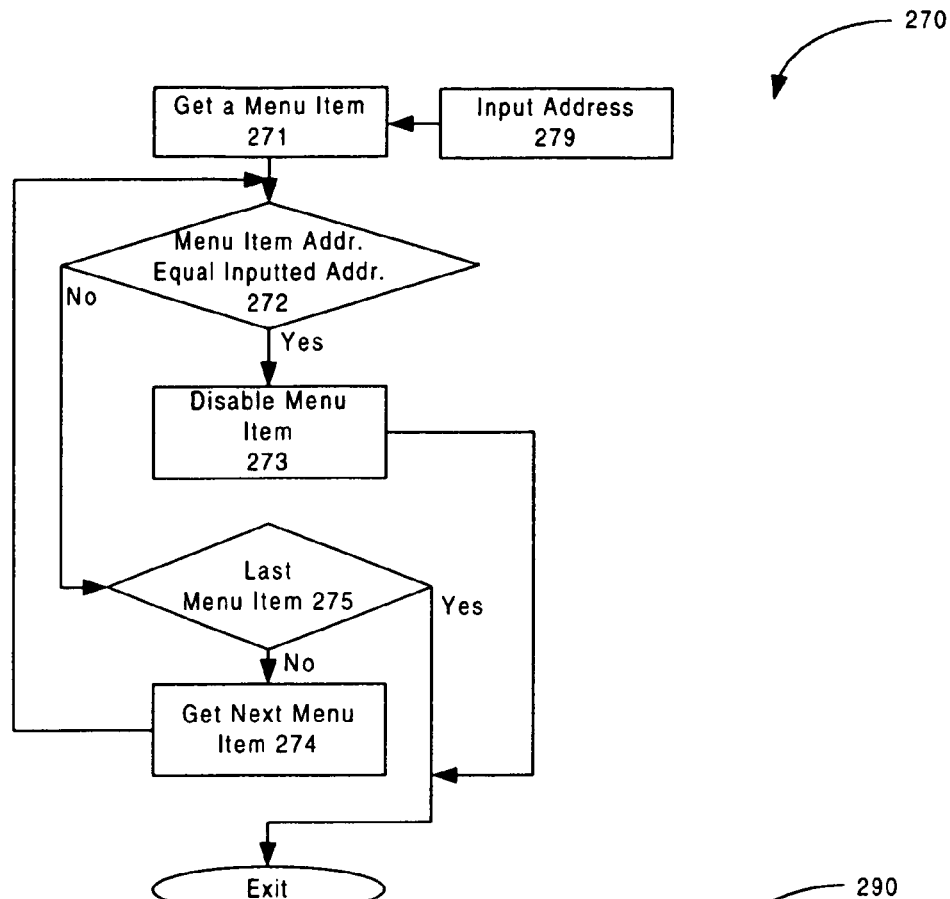

Referring now to FIG. 12B, there is shown a flow diagram of an embodiment of a participant list routine 270. Participant list routine 270 is used for inactivating a Name and an associated Address, such as a network address, from a Menu Item array. At 279, an Address, and optionally a Name, to be removed is inputted. At 271, a determination is made as to whether a Menu Item has the same address as Address. If yes, then this Menu Item is disabled at 273. If no, then a check is made to determine if this Menu Item is the last Menu Item at 275. If it is not the last Menu Item, then at 274 a Next Menu Item is obtained and this routine 270 begins again at 272. If it is the last Menu Item at 275, then this routine 270 exits.

Server-Client

Figure 13:
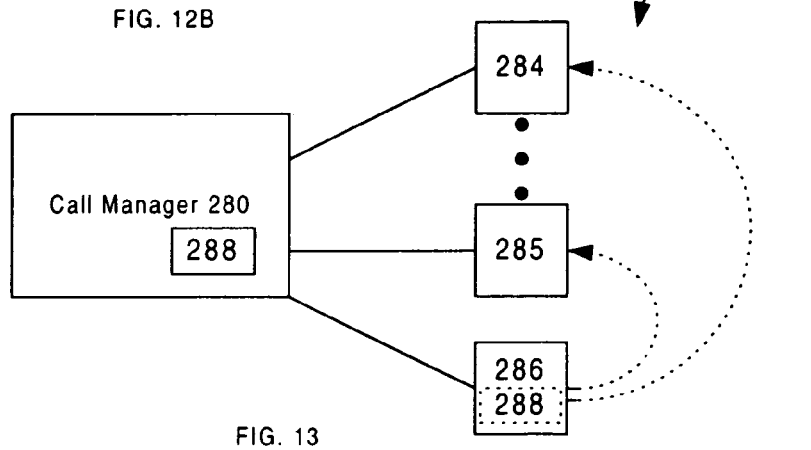
FIG. 13 is a block diagram of an exemplary portion of an embodiment of a server-client network in accordance with the present invention.

Referring now to FIG. 13, there is shown a block diagram of an exemplary portion of an embodiment of a server-client network 290 in accordance with the present invention. A server interface program 288, namely a server version of interface program 108, is employed in a call manager 280. Call manager 280, apart from server interface program 288, is well known in telecommunications. Call manager 280 manages calls of clients 284, 285 and 286, which may be respective computer systems as described elsewhere herein, including calling one or more clients, and maintaining and updating connection status information associated therewith. Server interface program 288 in cooperation with call manager 280 uses such information to provide a participant list as described elsewhere herein. Server interface program 288 provides an interface, such as GUI 141, to those clients involved in application sharing. Alternatively, server interface program 288 may be part of client 286. Server program 288 in this alternative embodiment may initiate placement of calls from server-client 286 to clients 284 and 285 for application sharing as described elsewhere herein.

Although the present invention has been particularly shown and described with respect to certain embodiments thereof, including without limitation a best mode if any, it should be readily apparent to those of skill in the art that various structural, logical, electrical, and other changes in form and detail may be made to these embodiments without departing from the scope of the present invention as set forth in the appended claims. Accordingly, the present invention is defined only by the appended claims that follow this detailed description.

What is claimed is:

1. A method of application sharing between a host user and at least one audience member, comprising:
    selecting at least one document to be shared by the host user;
    selecting the at least one audience member with whom to share the at least one document; and
    automatically establishing a substantially real-time shared viewing of the at least one document between the at least one audience member and the host user.

2. A method of application sharing between a host user and audience members, comprising:
    selecting documents to be shared by the host user;
    selecting the audience members with whom to share the documents; and
    automatically establishing a substantially real-time shared viewing of the documents between the audience members and the host user.

3. The method of claim 2, wherein the documents are selected by selecting a first single object.

4. The method of claim 3, wherein the audience members are selected by selecting a second single object.

5. The method of claim 2, wherein the audience members are selected by selecting a first single object.

6. The method of claim 5, wherein the documents are selected by selecting a second single object.

7. A method of application sharing between a host user and a participant, comprising:
    providing a first computer system having a first operating system, a first conferencing program and an interface program;
    providing a document and an application program associated with the document on the first computer system;
    providing a second computer system having a second operating system and a second conferencing program;
    providing a communication link operatively coupling the first computer system to the second computer system;
    selecting by the host user the document;
    selecting by the host user the participant; and
    automatically establishing a substantially real-time shared viewing of the document on the first computer system and the second computer system using the interface program.

8. A method for application sharing between a host user and a participant, comprising:
    providing a computer system, the computer system having an operating system, an application program and a conferencing program;
    providing a file associated with the application program on the computer system;
    initiating an interface program;
    providing a graphic user interface on the computer system associated with the interface program;
    initializing an application list for the graphic user interface;
    determining if the file associated with the application program has been selected; and
    providing a share view menu in response to a selection of the file.

9. The method of claim 8, further comprising:
providing a second computer system, the second computer system having another operating system compatible with the operating system and having another conferencing program compatible with the conferencing program;
providing a status indicator for the graphic user interface;
operatively coupling the first computer system and the second computer system for communication therebetween; and
contextually updating the status indicator responsive to connection status between the first computer system and the second computer system.

10. The method of claim 8, further comprising providing a participant list associated with the share view menu in response to the selection of the file.

11. The method of claim 8, further comprising:
providing a second computer system, the second computer system having another operating system compatible with the operating system and having another conferencing program compatible with the conferencing program;
providing a status indicator for the graphic user interface;
operatively coupling the first computer system and the second computer system for communication therebetween; and
contextually updating the status indicator responsive to connection status between the first computer system and the second computer system.

12. The method of claim 8, wherein the application list is configurable to provide window titles.

13. The method of claim 8, wherein the application list is configurable to provide document titles.

14. A method for providing a window list, comprising:
providing a computer system, the computer system having a windowing operating system;
displaying the window list in a user interface;
locating a window;
obtaining information associated with the window; and
using at least one heuristic and the information to determine if the window should be added to the window list.

15. The method of claim 14, further comprising:
adding the window to the window list; and
locating another window.

16. The method of claim 14, further comprising:
determining whether the window is already on the window list;
if the window is not already on the window list, adding the window to the window list:
if the window is already on the window list, using the information to update the window on the window list; and
determining whether another window is available.

17. A method for providing a window list, comprising:
providing a computer system, the computer system having a windowing operating system;
locating a window;
displaying the window list in a user interface;
obtaining information associated with the window; and
using heuristics and the information for:
determining if the window should be added to the window list; and
if the window should be added to the window list, determining how at least a portion of the information should appear on the window list.

18. A method for application sharing, comprising:
providing a first programmed computer system having a first screen display;
providing a file on the computer system, the file associated with an application program;
providing a first object associated with the file on the first screen display;
selecting the file for shared viewing;
providing a popup menu for the shared viewing, the popup menu configurable to have a list of selectable participants associated therewith;
selecting a participant for the shared viewing;
loading the file into the application;
determining if a second programmed computer associated with the participant selected is in electrical communication with the first programmed computer, the second programmed computer having a second screen display;
if the second programmed computer is not in electrical communication with the first programmed computer, placing a call from the first programmed computer to the second programmed computer using at least in part an Internet Protocol address, and establishing connectivity between the first programmed computer and the second programmed computer for electrical communication therebetween; and
substantially real-time shared viewing of a working image associated with the file on the first screen display and the second screen display.

19. The method of claim 18, wherein the participant is selected from the list of selectable participants.

20. A method of application sharing from a host computer, comprising:
providing a list of shareable window titles;
selecting a window title from the list of shareable window titles;
determining if the window title selected is currently being shared;
if the window title selected is not currently being shared,
providing a popup menu for sharing a file associated with the window title;
selecting with the host computer a participant computer with whom to share the file;
establishing connectivity for sharing the file between the host computer and the participant computer selected; and
substantially real-time shared viewing of the file on the host computer and the participant computer selected.

21. The method of claim 20, further comprising providing substantially real-time shared editing of the file, the shared editing shareable between the host computer and the participant computer selected.

22. The method of claim 21, further comprising:
providing a status indicator; and
changing the status indicator to indicate a shared viewing state or a shared editing state.

23. The method of claim 20, wherein the window title selected is currently being shared, further comprising:
selecting at least one other participant computer with whom to share the file;
establishing connectivity for sharing the file with the other participant computer selected; and
substantially real-time shared viewing of the file on the host computer, the participant computer selected and the other participant computer selected.

24. The method of claim 23, further comprising providing substantially real-time shared editing of the file, the shared editing shareable between the host computer, the participant computer selected and the other participant computer selected.

25. The method of claim 23, further comprising:
maintaining an active participant count; and
maintaining an active participant list.

26. A method for storing an application-sharing meeting configuration, comprising:
providing a programmed computer system;
selecting a name to save a state of the application-sharing meeting configuration;
saving an address for each participant;
saving descriptors for each shared application;
adding the name to the application-sharing meeting configuration; and
restoring the application-sharing meetix, configuration, the restoring comprising:
selecting the name;
reading the address stored for each participant;
attempting to establish electrical communication with each participant computer;
reading the shared window descriptors stored for each shared application;
searching for matching active applications associated with the shared window descriptors; and
attempting to open unmatched applications associated with the shared window descriptors.

27. A method for storing an application-sharing meeting configuration, comprising:
providing a programmed computer system;
selecting a save meeting command;
selecting a name to save a state of the application-sharing meeting configuration;
saving an address for each participant of the application-sharing meeting configuration to the programmed computer system;
saving descriptors for each shared application of the application-sharing meeting configuration to the programmed computer system; and
saving the name to the application-sharing meeting configuration; and
restoring the application-sharing, meeting configuration comprising:
selecting a restore meeting command;
selecting the name;
reading the address stored for each participant;
attempting to establish electrical communication with each participant programmed computer system;
reading the shared window descriptors stored for each shared application;
searching for matching active applications associated with the shared window descriptors; and
attempting to open unmatched applications associated with the shared window descriptors.

28. A method of adjusting a participant list, comprising:
providing a target name and associated network address;
setting a use item equal to a menu item;
determining if the use item is currently in use;
if the use item is not in use,
setting a label of the use item to the target name;
setting an address of the use item to the associated network address; and
enabling use of the use item.

29. The method of claim 28, further comprising:
if the use item is in use, determining if the associated network address is equal to an address of the menu item;
if the associated network address equals the address of the menu item,
the setting of the label of the menu item to the target name; and
the enabling of use of the menu item.

30. The method of claim 29, further comprising:
if the associated network address does not equal the address of the menu item, determining if the menu item is in use;
if the menu item is not in use,
setting the use item equal to the menu item;
the setting of the label of the use item to the target name;
the setting of the address of the use item to the associated network address;
the enabling of use of the use item; and
if the menu item is in use, getting a next menu item.

31. The method of claim 30, wherein the associated network address is an Internet Protocol address.

32. The method of claim 31, further comprising:
checking for a last menu item if the menu item is in use;
if the menu item is the last menu item, setting the use item equal to an added menu item;
the setting of the label of the use item to the target name;
the setting of the address of the use item to the Internet protocol address; and
the enabling of use of the use item.

33. A method of adjusting a participant list, comprising:
providing a first Internet Protocol ("IP") address;
getting a menu item having a second IP address;
determining if the second IP address of the menu item is equal to the first IP address;
if the first IP address and the second IP address are equal, disabling the menu item;
if the first IP address and the second IP address are not equal, checking for a last menu item; and
if the menu item is not the last menu item, getting a next menu item.

34. A system for application sharing, comprising:
a call manager, the call manager having an interface program;
a plurality of communication devices for electrical communication with the call manager;
the call manager configured to manage calls to and from the plurality of communication devices for establishing connectivity for the application sharing; and
the interface program in cooperation with the call manager configured to maintain status information regarding the connectivity, the status information including current number of active participants.

35. The system of claim 34, wherein the interface program automatically establishes at least a substantially real-time shared viewing of at least one document between at least one audience member and a host user, wherein the host user only selects the at least one document to be shared and the at least one audience member with whom to share the at least one document to initiate the substantially real-time shared viewing.

36. The system of claim 35, wherein the status information includes a name for each active participant.

37. A system for application sharing, comprising:

a call manager;

a plurality of computer systems which may be put in electrical communication with the call manager, at least one of the plurality of computer systems having an interface program;

the interface program configured to initiate calls to the plurality of computer systems;

the call manager configured to manage the calls to the plurality of computer systems for the application sharing; and the interface program in cooperation with the call manager configured to maintain status information regarding the connectivity, the status information including current number of active participants.

38. The system of claim 37, wherein the interface program automatically establishes at least a substantially real-time shared viewing of at least one document between at least one audience member and a host user, wherein the host user only selects the at least one document to be shared and the at least one audience member with whom to share the at least one document to initiate the substantially real-time shared viewing.

39. The system of claim 38, wherein the status information includes a name for each active participant.

* * * * *